United States Patent [19]
Canevari

[11] 3,967,777
[45] July 6, 1976

[54] APPARATUS FOR THE TREATMENT OF TAR SAND FROTH

[75] Inventor: Gerard P. Canevari, Cranford, N.J.

[73] Assignee: Exxon Research and Engineering Company, Linden, N.J.

[22] Filed: Nov. 27, 1974

[21] Appl. No.: 527,601

Related U.S. Application Data

[62] Division of Ser. No. 395,930, Sept. 10, 1973.

[52] U.S. Cl. ............................ 233/3; 233/19 R; 233/31
[51] Int. Cl.² ...................... B04B 1/12; B04B 11/02
[58] Field of Search .............. 233/14 R, 3, 7, 27, 233/28, 31, 32, 33, 19 R

[56] References Cited
UNITED STATES PATENTS

| | | | |
|---|---|---|---|
| 2,448,038 | 8/1948 | Lykken et al. | 233/27 X |
| 2,724,549 | 11/1955 | Brown | 233/3 X |
| 2,905,380 | 9/1959 | Matthews | 233/27 |
| 3,073,516 | 1/1963 | Glasson | 233/28 |

FOREIGN PATENTS OR APPLICATIONS

| | | | |
|---|---|---|---|
| 182,445 | 1/1963 | Sweden | 233/27 |

Primary Examiner—George H. Krizmanich
Attorney, Agent, or Firm—Reuben Miller

[57] ABSTRACT

An improved disc recycling type of centrifuge apparatus which includes means for converting the flow direction of the recycled underflow and causing the recycled underflow to self impact.

8 Claims, 8 Drawing Figures

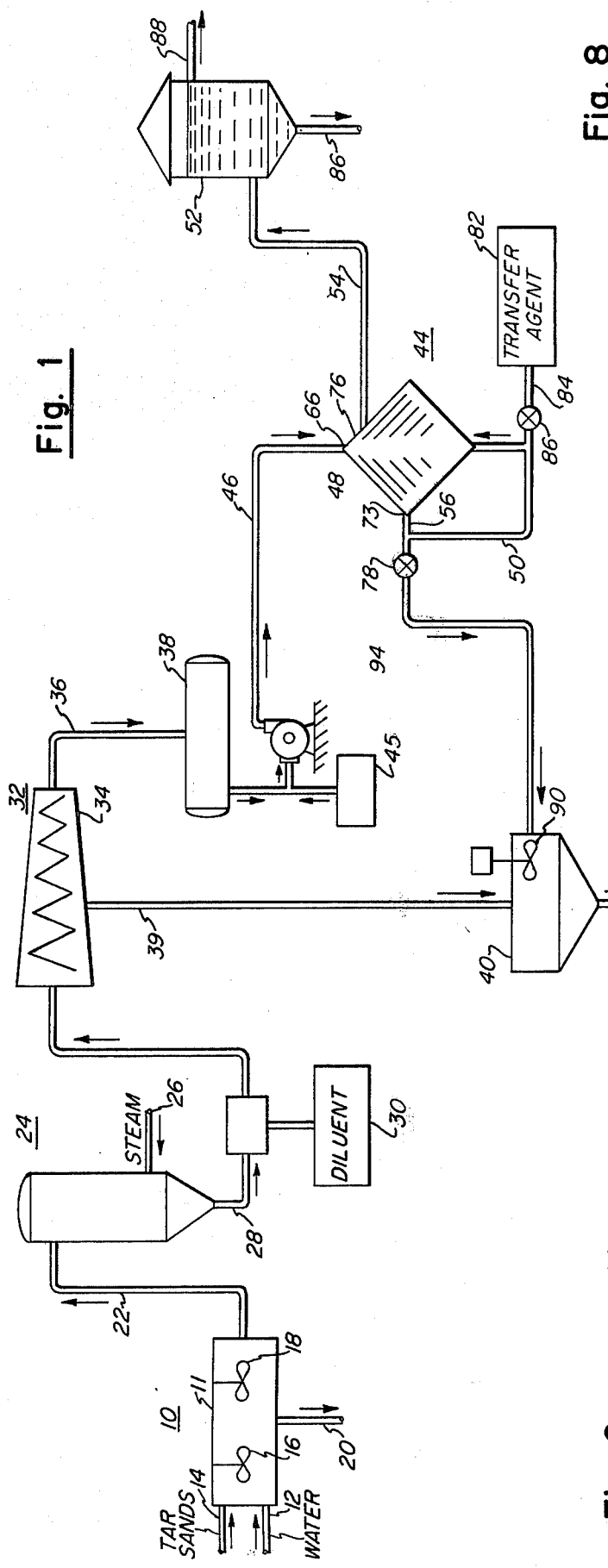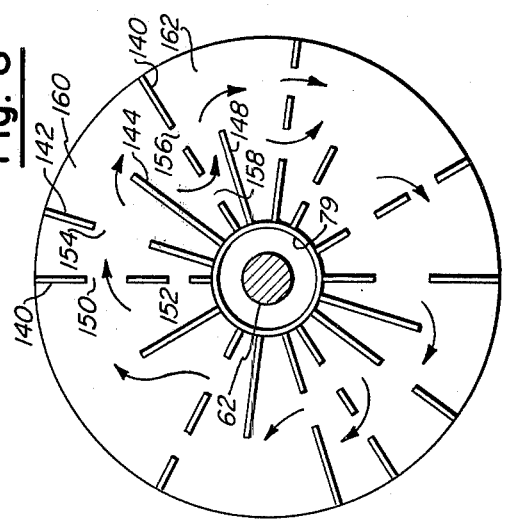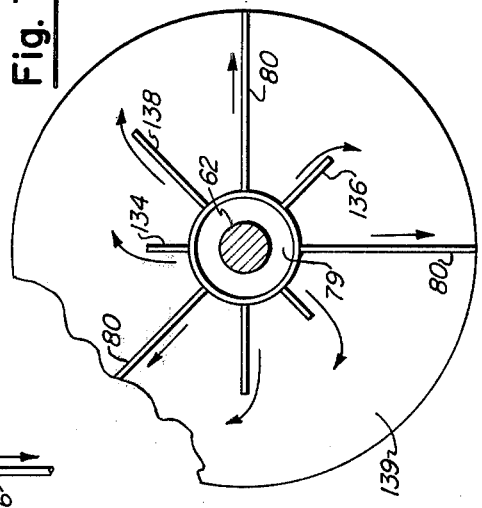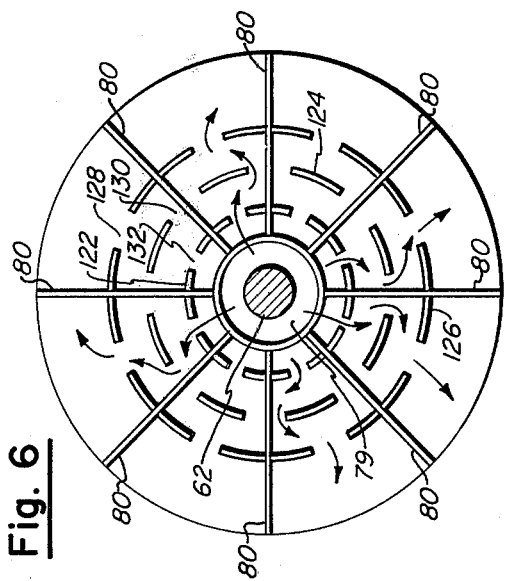

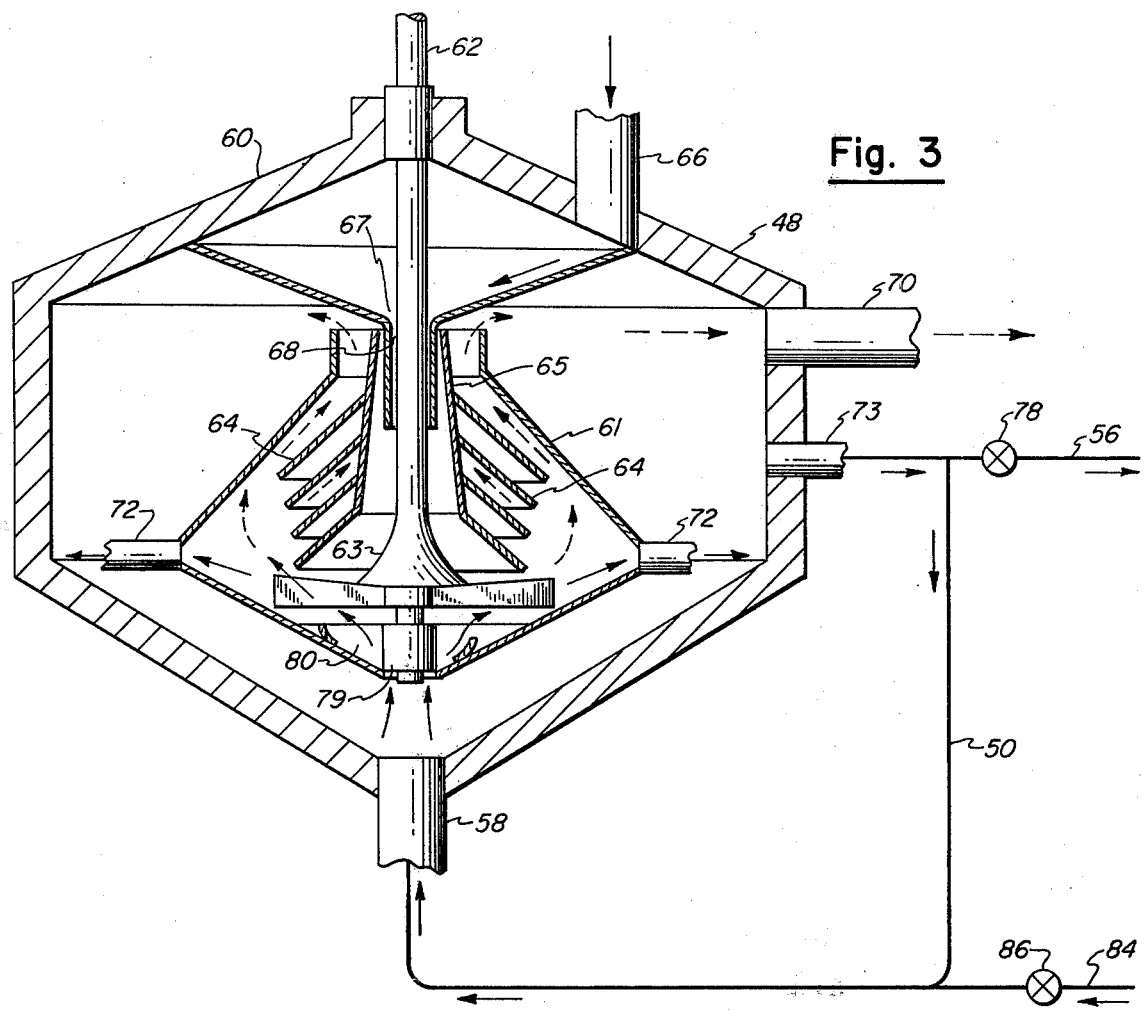
Fig. 3
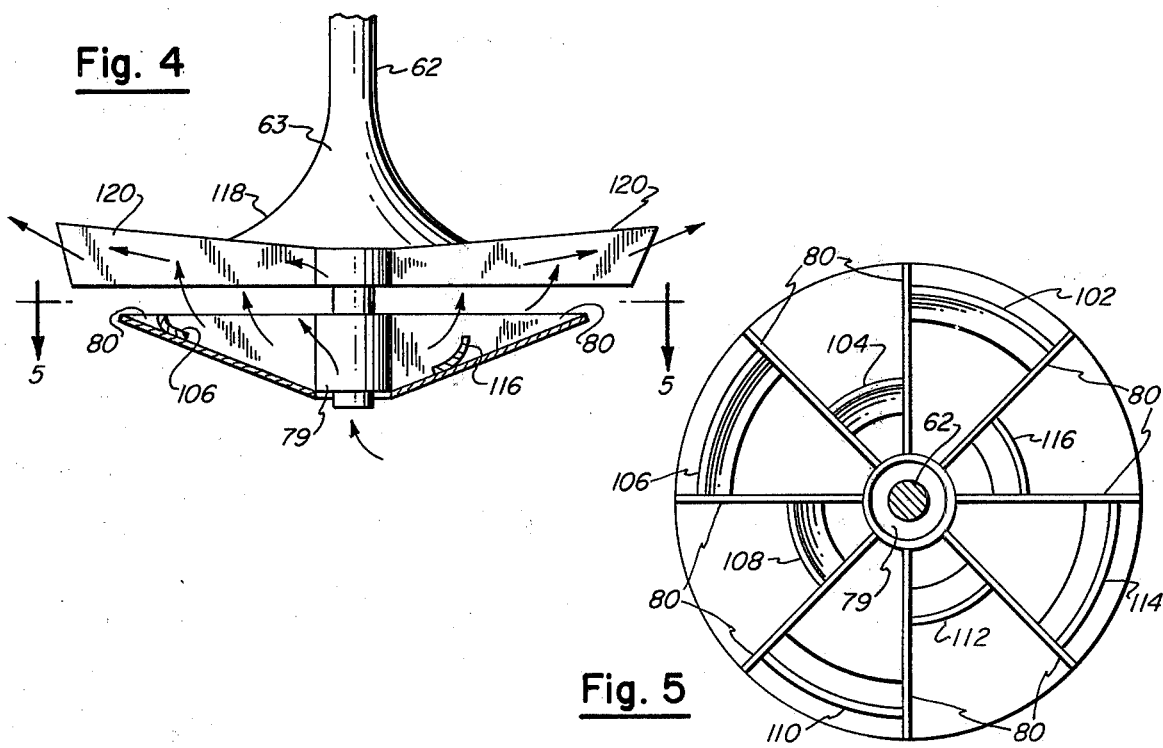
Fig. 4
Fig. 5

APPARATUS FOR THE TREATMENT OF TAR SAND FROTH

This is a division of application Ser. No. 395,930, filed Sept. 10, 1973.

This invention relates generally to the recovery of hydrocarbons from tar sands and more particularly to an improved method and apparatus for separation which increases the yield of hydrocarbons such as oil or bitumen tars and the like from tar sand.

Tar sands are natural deposits which contain various types of hydrocarbons. They are found in numerous areas of the world as, for example, the heavy deposits of Athabaska tar sands located in Canada. These sands which represent a significantly large reserve of hydrocarbon constituents are deposited in beds located about 200–300 feet below an overburden and extend for a depth of about 100 to 400 feet. The tar sands are generally composed of a siliceous material having a particle size greater than that passing a 325 mesh screen, and are saturated with relatively heavy viscous oil or bitumen which varies from about 5 to 21 percent by weight and is generally in the range of about 12% by weight. The gravity of this oil or bitumen ranges from about 6° to 10° API and is generally about 8° API. The oil or bitumen is quite viscous and contains about 4.5 percent sulfur and about 38 percent aromatics. A typical oil or bitumen recovered from the sands has an initial boiling point of about 300°F., 4 percent distilled to 430°F., 20 percent distilled to 650°F. and 50 percent distilled to 980°F.

Various separation methods have been proposed wherein the oil or bitumen are separated from the tar sands by treatment with water. Each of these techniques has been hindered to some extent by the presence of solid fines. The tar sands contain clay and silt in quantities of from 1 to 50 percent by weight of the total composition and usually about 5 percent. The silt is a material which will pass a 325 mesh screen but which is larger than about 2 microns. Clay is material smaller than 2 microns including some siliceous material of that size. It has been found that the presence of relatively small quantities of the slit and clay can substantially hinder the recovery of the oil or bitumen tar sand when utilizing water separation techniques. It appears that the oil and the solid fines form skins which envelop small pockets of water often containing finely divided sands. The enveloped pockets are distributed in the oil thus forming a water in oil type of emulsion.

In a commercial separating technique, a froth is formed by combining the tar sands with hot water at temperatures in the range of 140° to 200°F. The sand and water are thoroughly agitated and mixed and the sand is withdrawn in a first stage of the process while a froth comprising water, non-separated solids and oil is also withdrawn from this stage. This froth is introduced into a second stage where it is contacted with additional water having a temperature in the range of about 160° to 200°F. Substantially all but about 10 percent of the solids are removed with the water from the second stage while a bitumen froth containing from about 5 to 15 percent solids is also withdrawn from the stage. The bitumen froth is diluted with a solvent such as a naphtha and is then conveyed to one or more centrifuging stages for removing additional water and residual minerals. The naphtha is then distilled off and the bitumen is coked to a high-quality crude suitable for further processing.

Various techniques have also been proposed for increasing the efficiency of separation of the oil or bitumen from the tar sand froth. The use of various transfer agents such as alkali metal phosphate compounds has been suggested as a deflocculant which is introduced into the system along with the tar sands or water before the centrifuging separation stage or stages. However, relatively large quantities of transfer agents are required in order to effect the desired enhanced separation. It has further been proposed to recycle a portion of the water content which is separated in a subsequent centrifuging stage to a preceding centrifuging separating stage for improving the flowability of the separated sands. While this form of recycling enhances the use of water in the transfer of separated sands, it does not effectively increase the separation of bitumen from the sands.

Accordingly, it is an object of this invention to provide an improved method for the separation of oil or bitumen from tar sands.

Another object of this invention is to provide an improved water treatment method for the separation of oil or bitumen from tar sands.

Another object of the invention is to provide a centrifuging separating process for tar sand froth which provides enhanced yields.

Another object of the invention is to provide a centrifuging method of separating oil or bitumen from tar sands which utilizes a relatively small quantity of transfer agent and which results in relatively high yields of oil or bitumen.

Another object of the invention is to provide an improved type of disc recycling centrifuging apparatus.

In accordance with the general features of the method of this invention, a tar sand froth is centrifuged to provide an overflow effluent comprising an oil or bitumen phase and an underflow effluent comprising water and bitumen-wetted solids. The underflow effluent is reintroduced into the centrifuge in a recycling circuit and a water-wetting transfer agent is combined with the underflow effluent in the recycling circuit to cause the solids to become water-wet and transfer from an oil/water interface to a water phase which is then rejected.

In accordance with more particular features of the method of this invention, the underflow effluent is recycled in a disc centrifuge and a water-wetting transfer agent is mixed and contacted with the recycled underflow. The transfer agent is mixed in the recycle circuit in an amount ranging from about 0.01 percent and 1.0 percent by weight and preferably between about 0.1 percent and 0.5 percent by weight. The underflow effluent represents a concentrate to which a relatively small amount of transfer agent is added in order to obtain the desired wetting relative to the quantity which would be required when added to the input to the stage. The quantities of transfer agent added to the underflow in the recycle circuit is on the order of one-tenth of that quantity which would be required to be added to a froth which is initially charged to the inlet of the centrifuge to provide a substantially equivalent separation. A significant reduction in the material and cost of the separation thus accompanies the enhanced separation.

In accordance with other features of the invention, a demulsifying agent is also added to the inlet to the centrifuging stage for enhancing the separation of the bitumen oil from the tar sand forth.

In accordance with further features of the invention, a recycling disc-type centrifuge is provided having means for increasing contact of the recycled underflow and thereby enhancing separation.

These and other objects and features of the invention will become apparent with reference to the following specification and to the drawings wherein:

FIG. 1 is a schematic diagram illustrating a tar sand treatment process operating in accordance with features of the present invention;

FIG. 3 is a schematic view of a recycling disc-type of centrifuge constructed in accordance with features of this invention;

FIG. 4 is an enlarged view of an accelerating vane assembly portion of the centrifuge of FIG. 3;

FIG. 5 is a view taken along lines 5—5 of FIG. 4;

FIG. 6 is an alternative accelerating vane assembly arrangement for use with the centrifuge of FIG. 3;

FIG. 7 is a further alternative accelerating vane assembly arrangement for use with the centrifuge of FIG. 3; and, FIG. 8 is still a further alternative accelerating vane assembly arrangement for use with the centrifuge of FIG. 3.

Figure 2:
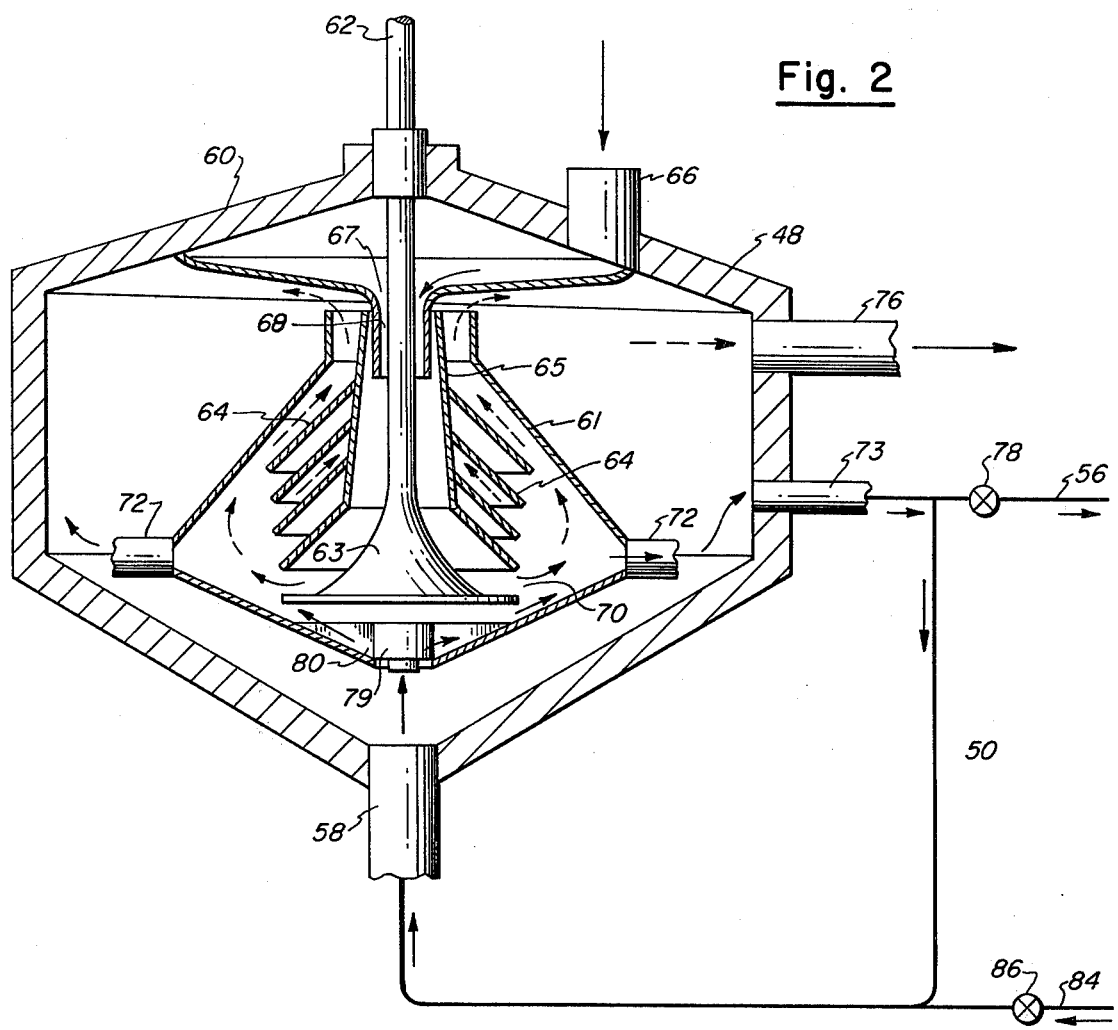
FIG. 2 is a schematic diagram of a conventional recycling disc-type of centrifuge.

Referring now to FIG. 1, water is mixed with tar sands in a stage 10 to form a tar sand froth. Water is introduced into a mixing vessel 11 through an inlet line 12 while tar sands such as Athbasca tar sands as described hereinbefore are introduced into the vessel via an inlet line 14. The tar sands and water are thoroughly agitated and mixed by means of stirrers 16 and 18. Coarser solids which are separated by settling are withdrawn from the vessel through a line 20 while a tar sand froth produced by the agitation of water and tar sand is withdrawn from the vessel 11 via an outlet line 22.

The amount of water used in stage 10, based upon the volume of tar sands, may be varied appreciably, as for example, from about 0.5 to 2.0 volumes of water, preferably about 0.8 to 1.2 volumes such as 1 to 1 volume of water per volume of tar sands. Temperatures maintained in the stage 10 are in the range of from about 140° to 200°F., preferably in the range of from about 170° to 190°F. such as about 180°F. Under these conditions, a large portion of the solids, particularly sand, are removed from zone 10 by means of line 20.

The froth produced comprises water, non-separated solids and oil. The froth comprises from about 25 to 45 percent by weight of water, as for example 35 percent by weight of water, 5 to 25 percent by weight of solids, as for example about 15 percent by weight of solids, the remainder being bitumen.

The froth, which is withdrawn through line 22, is conveyed to a froth heating stage 24 where it is heated with steam. Steam is applied to the stage through an inlet line 26. The steam-heated froth is drawn from the stage 24 through a line 28 and is diluted with solvent such as naphtha or other diluent derived from a source 30. Dilution of the froth reduces the viscosity and specific gravity of the bitumen for centrifuging. Generally, the weight ratio of diluent to bitumen lies within the range of about 0.3 and 1.0.

The diluted froth is then applied to a centrifuge stage 32 wherein it is centrifuged by a relatively low speed centrifuge 34 in order to remove material which would otherwise plug the relatively close clearances of subsequent centrifuges. These clearances depend upon the centrifuge design. Typically, material less than 20 microns will not plug centrifuges such as disc-type centrifuges. A bitumen froth product having reduced larger size mineral content is discharged from the centrifuge 34 via a line 36 to an overflow tank or reservoir 38. An underflow effluent from the centrifuge 34 consisting principally of mineral products and water is conveyed by a line 39 to a tailings sump and mixer 40.

The centrifuged bitumen froth is combined with a demulsifying agent and is conveyed to a second centrifuging stage 44. A demulsifying agent, which is described in greater detail hereinafter, is derived from a source 45 and is mixed with the froth which is pumped from the tank 38 to a disc-type recycling centrifuging stage 44 via a line 46. Preferably, the demulsifying agent is injected into the suction side of the pump so as to utilize the pump for mixing the demulsifier with the froth. The centrifuge stage 44 comprises a high speed, nozzle-bowl, disc-type centrifuge 48 having a return flow circuit or loop 50. An overflow effluent comprising a bitumen phase is separated and is passed to a vessel 52 through a line 54. An underflow effluent comprising water and bitumen wetted solids is separated by the cemtrifuge 48 and is removed therefrom via a line 56. The underflow effluent is returned in part via the line 50 to a recycle inlet 58 of the centrifuge.

FIG. 2 illustrates in greater detail the operation of the centrifuge 48. The centrifuge comprises a stationary housing 60 and a high speed rotor housing 61 which is positioned within the stationary centrifuge housing and is mounted to a drive shaft 62 for rotation therewith. The high speed rotor includes a vane-shaped impeller assembly 63 which is mounted to a lower segment of the drive shaft, and a stack of discs 64 which extend outwardly at an angle from, and are supported by, a stack support 65. The tar sand froth enters an inlet port 66 of the centrifuge 48 and flows to a feedwell 67. The tar sand froth then flows from the feedwell 67 via a central passage 68 formed between the drive shaft 62 and feedwell to the mixing impeller 63. The mixing impeller 63 brings the froth up to rotor speed. The froth then enters a separation chamber 70 of the rotor where relatively large centrifugal forces on the order of thousands of times the force of gravity cause the major portion of the solids in the tar sand froth to progress rapidly outward to the periphery of the rotor housing 61 as indicated by the solid arrows. These solids are continuously expelled through fixed open nozzles 72 in the rotor and through an outlet aperture 73 into the underflow loop. Small quantities of lighter solid material, entrained in liquid, are forced inwardly up through the stack of discs 64 as indicated by the dashed arrows where even the smallest particles become impinged on the underside of the discs. As these solids agglomerate and gain density, they fall counter to the fluid flow into the separation chamber 70 to join heavier material and are passed through the rotor nozzles 72. The liquid flows up through the disc stack through an aperture formed between the disc stack and rotor housing 61, out of the rotor housing 61, and from the centrifuge through an outlet aperture 76.

Flow valve means 78 is provided for diverting the underflow of line 56 to the return flow line 50 for reintroduction of the underflow into the centrifuge through the recycle inlet port 58. The recycled material flows into a lower inlet port 79 of the rotor and is contacted by a rotating vane assembly 80. This assembly accelerates the recycled material and causes the solids to elute from the nozzle 72 with the underflow stream. The volume of underflow effluent which is recycled is controlled by adjustment of the flow valve 78.

In accordance with a feature of this invention, a "transfer agent" is mixed with the recycled underflow effluent. As illustrated in FIG. 1. the transfer agent is derived from a source 82 and is charged via a line 84 and a flow control valve 86 to the recycling circuit 50 where it is mixed with the recycled underflow. An unexpected and enhanced separation and recovery of bitumen is effected by addition of the transfer agent to the recycled underflow effluent.

The transfer agent comprises a wetting agent which causes the solids in the recycle line to become water-wet and permit the disassociation of the bitumens from the solids which are then recovered. The additive mixture introduced by means of line 84 from the source 82 contains between about 0.01 and 1.0 wt.% based on a total froth in the recycle circuit and preferably between about 0.1 and 0.5 wt.% of a transfer agent such as tetrasodium pyrophosphate or sodium tripolyphosphate. Other equivalent chemicals which may be utilized are for example potassium pyrophosphate, sodium hexametaphosphate and sodium silicate. These transfer agents promote the transfer of the solid fines from the oil/water interface into the aqueous phase by establishing a uniform electropotential over the entire surface of the particle. In general, "inorganic builders" and "condensed phosphates" act as transfer agents. The addition of a transfer agent in the recycle circuit of the disc-type centrifuge significantly reduces the amount of transfer agent necessary to effect the maximum separation of bitumen from the minerals. The addition of a transfer agent to the feed to stage 44 would require an amount of transfer agent greater by an order of magnitude than has been found to provide the same separation characteristic when added in the recycle circuit of the centrifuge. The underflow effluent represents a concentrated stream with which the relatively small amount of transfer agent employed effects a significant separation.

The light centrifuge effluent of port 76 is conveyed to the vessel 52 via the line 54 and includes a water content which settles and is drawn off from the tank by a line 86. The mixture of bitumen plus solids is drawn from this vessel through a line 88 and is conveyed to subsequent stages (not shown) for distillation of the naphtha diluent and for coking of the bitumen to a high quality crude which is suitable for further processing. The tailings recovery tank 40 includes an agitator 90 for combining the discharge of the disc centrifuge 48 which is passed thereto via line 94 and the tailings from the first stage centrifuge which is passed to the mixer 40 via the line 39. The residue contained within the reservoir 40 is agitated and drawn off to a tailing pond via a line 96.

Separation of the bitumen and minerals by the disc-type centrifuge 48 as described hereinbefore is enhanced by combining a demulsifying agent with the feed to the centrifuging stage 44. The demulsifying additive comprises a non-ionic surface active compound as for example a chemical demulsifier comprising a polyethoxyalkylene compound sold under the trade name of NALCO D-1645 produced by the NALCO Chemical Company.

Another preferred demulsifying solution is sold under the trade name of BREAXIT 7941 and comprises a mixture of: (1) one part of the reaction product of diethyl ethanolamine with premixed propylene oxide and thylene oxide. (Propylene oxide/ethylene oxide can range from 40/60 to 60/40, preferably 55/45.); and (2) approximately three parts of a palmitic acid ester of the reaction product of an alkyl phenol formaldehyde resin with ethylene oxide.

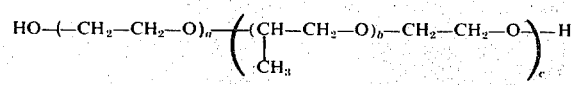

The mixture may be varied in the range of from about one part of the reaction product to two parts of the palmitic acid ester to one part of the reaction product to four parts of the palmitic acid ester. Other satisfactory demulsifiers are Pluronic polyols produced by the Wyandotte Chemical Company. These Pluronic compounds are polyoxypropylene glycols having a chemical structure as follows:

$$HO-(-CH_2-CH_2-O)_a-\left(-(CH-CH_2-O)_b-CH_2-CH_2-O-\right)_c-H$$
$$\qquad\qquad\qquad\qquad\qquad\;\; |$$
$$\qquad\qquad\qquad\qquad\;\;\; CH_3$$

$a$ = molecular weight range of 50 to 7000
$b$ = molecular weight range of 900 to 4000
$c$ = molecular weight range of 50 to 7000

These compounds have molecular weights ranging from about 1,000 to over 16,000.

The amount of demulsifier used is in the range from about 0.01 to 0.5 percent, for example, 0.2 percent by weight based on the weight of the total emulsion.

In instances where the froth may contain heavy minerals, for example, sometimes as high as 2 to 5 percent by weight of heavy minerals as for example zircon, rutile, ilmenite, tourmaline, apatite, staurolite, garnet, etc., it may be desirable to employ chelating agents in addition to a demulsifier and transfer agent. For example, chelating agents which may be used as part of the chemical mixture which is added to the tar sand froth drawn from the vessel 38 are ethylenediamine-tetraacetic acid, sodium gluconate, gluconic acid, sodium oxalate and diethylene glycol.

The method of the present invention may be more fully understood by the following examples illustrating the same:

EXAMPLE I

Whole tar sands were slurried with hot water (180°F.) and mixed. The residue, or washed sands, were then mixed with 3 parts of water to produce a 25 percent solids concentration slurry. An amount of tetrasodium pyrophosphate transfer agent was added equivalent to approximately 0.5 wt. percent based on the total liquid-solid slurry. This treated slurry was then mixed in a Waring Blender for approximately 20 seconds to simulate the contacting/mixing that would occur in the underflow recycle. The mixture was then transferred to a laboratory centrifuge and maintained at 1000 G's for 2 minutes. At the end of this interval, free bitumen was observed floating on the surface of the centrifuge tube. The following illustrates the degree of bitumen recovery by this process.

| | |
|---|---:|
| Bitumen content of tar sand feedstock | 10.4% |
| Bitumen content of residue tar sand after lab hot water wash | 0.48% |
| Bitumen content of tar sand after | |

-continued

| | |
|---|---|
| treatment by transfer agent | .06% |

Therefore, effectiveness of Bitumen Recovery from Tailings =

$$\frac{0.48 - .06}{0.48} = 87.5\%$$

EXAMPLE II

In a repeat laboratory simulation experiment, the pH of the hot water wash adjusted to 9.5 by the addition of approximately 1 wt. percent NaOH. Subsequent experimental steps described in Example I were repeated and yielded the following results:

| | |
|---|---|
| Bitumen content of tar sand feedstock | 10.4% |
| Bitumen content of residue tar sand after lab hot water (pH = 9.5) wash | 0.12% |
| Bitumen content of residue tar sand after treatment by transfer agent | 0.03% |

Therefore, effectiveness of Bitumen Recovery from Tailings =

$$\frac{0.12 - 0.3}{0.12} = 75\%$$

In this second example, a more complete recovery of bitumen had been obtained in the extraction step. Hence, the recovery of the smaller amount of bitumen remaining in the tailing is more difficult (75 percent vs. 87.5 percent) but still practical.

In the known centrifuge arangement of FIG. 2, the disc stack 65 is employed primarily for the initial separation of solids or for clarification. The purpose of the underflow recycle stream is to effect a design compromise and provide a more adequate loading of the centrifuge nozzle 72 with the heavier phase. While a large number of nozzles is desired in order to minimize plugging, the resultant high capacity of such an arrangement is undesirable and may not provide sufficient settling time for concentrating the solids. The lighter overflow liquid would then flow through these nozzles along with the heavier overflow. Recycling of the heavy phase maintains a nozzle loading and the loss of overflow liquid through the underflow circuit is prevented.

The known centrifuge arrangement of FIG. 2 has been employed for removing part or all of the mother liquor from solids, i.e., oil from wax, or dewaxing, or to extract an undesirable component in the mother liquor, i.e., waxy polymer and ash for polypropylene. This is accomplished by "washing" wherein a wash liquid is either injected into the stage independently and outside of the centrifuging arrangement or it is mixed with the recycled underflow. In those instances when the washed liquor is heavier than the mother liquor, i.e., water washed for oil/sand separation, the heavier wash readily displaces the lighter mother liquor. However, in instances such as the use of a propane wash for oil/wax separation or a methanol wash for a xylene/polypropolylene separation, a solution of the mother liquor of the wash occurs rather than a displacement. The effectiveness of this solution depends on the mixing characteristics of the washed liquor with the mother liquor. In many instances, the liquid is entrapped in the interstices of the solid particles or is occluded in a matrix of agglomerated particles.

A disc-type recycling centrifuge which provides enhanced underflow separation and which enhances the yield of bitumen is illustrated in FIGS. 3-8. Those numbers of FIGS. 3-8 which are similar in structure and operation to members of FIG. 2 bear the same reference numerals. The centrifuge illustrated in FIG. 3 includes a means for causing acceleration and attrition of the recycled underflow effluent in order to effect a more complete mixing of the transfer agent and the oil or bitumen that is occluded in solid particles. Separation is enhanced whereby occluded liquor that is "locked up" is freed by attrition or a breaking up of these agglomerates. Referring now to FIGS. 3, 4 and 5, the underflow recycle acceleration of the high speed rotor 61 is shown to have a plurality of concave, upwardly extending vanes 102–116 spaced between the plurality of accelerating vanes 80. These concave vanes direct the relatively solid rich underflow slurry against an upper assembly 118 of radially extending accelerating baffles 120. Significant mixing energy or attrition results with this arrangement as the recycled slurry is carried by virtue of its relatively high flow rate successively to the centrifuge underflow inlet port 58, to the rotor underflow inlet port 79 and to this accelerator/attritor where the slurry is caused to be directed against itself at a relatively high velocity. The occluded liquid is released from the solid particles permitting the transfer agent to effectively contact the particles. The concave vanes, as illustrated by vanes 102 and 104, are spaced at different radial locations and are mounted between the vanes 80 by welding, for example.

FIG. 6 illustrates an alternative vane assembly for use with the centrifuge of FIG. 3 having a plurality of baffle assemblies 122, 124 and 126, which are concentrically located about the shaft 62 at different radial locations and have staggered or off-set openings or apertures 128, 130 and 132, respectively, for example, which are formed in the baffle assemblies for effecting reversal of flow and impact in the recycled material.

FIG. 7 illustrates an alternative vane arrangement for use with the accelerator attritor of FIG. 3 having interruped accelerating vanes 134, 136 and 138 extending radially and having different radial lengths for causing the recycled slurry to "slip off" a vane and contact other recycled material. These accelerating vanes are located between accelerating vane 80 which extends radially to the outer periphery 139 of the accelerating zone.

FIG. 8 illustrates another alternative vane arrangement for use with the centrifuge of FIG. 3 having a plurality of radially extending vanes exemplified by vanes 140–148 having staggered interruptions or apertures 140–162 formed in their radial length. This irregular accelerator vane arrangement permits both acceleration and impact between the recycled slurry particles.

There has thus been described an improved method for separating bitumen or oil from tar sands by adding a transfer agent to a recycled underflow stream of a disc-type recycling centrifuge. The method is further enhanced by the addition of a demulsifier to the feed to the centrifuge. The yield is further increased through the use of a centrifuge having a recycling vane assembly which causes attrition or impact between the slurried recycled particles.

Although a two-stage centrifuge arrangement has been described herein, at times a single stage of centrifuging comprising a disc-type of recycle centrifuge as described herein will provide satisfactory separation and is considered within the scope of this invention.

While particular embodiments of the invention have been described herein, it will be apparent to those skilled in the art that variations may be made therein without departing from the spirit of the invention and the scope of the appended claims.

What is claimed is:

1. An improved centrifuge comprising:
   a stationary centrifuge housing;
   a rotor assembly including a rotor housing positioned within said centrifuge housing;
   a rotary drive shaft means;
   said rotor assembly mounted to said drive shaft means for rotation therewith;
   a stack of discs mounted within said rotor housing for rotation with said rotor;
   a plurality of nozzles spaced about said rotor housing and communicating between the interior of said rotor and the interior of said centrifuge housings;
   means for introducing a feed into said rotor housing;
   an annular aperture formed between said disc stack and said rotor housing and communicating between the interior of said rotor housing and the interior of said centrifuge housing;
   means positioned within said rotor housing for accelerating said feed to velocities at which relatively higher and lower density components are separated and wherein said higher density components elute from said rotor housing through said spaced nozzles and said lighter density component elutes from said rotor housing through said annular aperture;
   means for drawing said lighter density material from said centrifuge housing;
   means for drawing said higher density material from said centrifuge housing and for reintroducing said higher density material into said centrifuge housing and into said rotor housing;
   accelerating means mounted within said rotor housing for rotation therewith for accelerating said reintroduced heavier density components to velocities for eluting said reycled heavier density components from said rotor housing through said apertures;
   means for diverting the flow direction and causing said heavier density components which are reintroduced into said rotor to self impact; and
   said means for impacting said reintroduced heavier density components comprising a plurality of concave shaped baffles spaced between a plurality of radially extending vanes and adapted for altering the direction of flow of said heavier density components for impact upon itself.

2. The apparatus of claim 1 wherin at least two of said concave baffles are spaced at different radial distances from said drive shaft.

3. The apparatus of claim 1 wherein said concave baffles are alternatively spaced at different radial distances from said drive shaft.

4. An improved centrifuge comprising:
   a stationary centrifuge housing;
   a rotor assembly including a rotor housing positioned within said centrifuge housing;
   a rotary drive shaft means;
   said rotor assembly mounted to said drive shaft means for rotation therewith;
   a stack of discs mounted within said rotor housing for rotation with said rotor;
   a plurality of nozzles spaced about said rotor housing and communicating between the interior of said rotor and the interior of said centrifuge housings;
   means for introducing a feed into said rotor housing;
   an annular aperture formed between said disc stack and said rotor housing and communicating between the interior of said rotor housing and the interior of said centrifuge housing;
   means positioned within said rotor housing for accelerating said feed to velocities at which relatively higher and lower density components are separated and wherein said higher density components elute from said rotor housing through said spaced nozzles and said lighter density component elutes from said rotor housing through said annular aperture;
   means for drawing said lighter density material from said centrifuge housing;
   means for drawing said higher density material from said centrifuge housing and for reintroducing said higher density material into said centrifuge housing and into said rotor housing;
   accelerating means mounted within said rotor housing for rotation therewith for accelerating said reintroduced heavier density components to velocities for eluting said recycled heavier density components from said rotor housing through said apertures;
   means for diverting the flow direction and causing said heavier density components which are reintroduced into said rotor to self impact; and
   said means for impacting said reintroduced heavier density components comprising a plurality of concentrically located arrays of vanes and wherein each array is located at a different radial location, each of said arrays having a plurality of apertures, each of said apertures in an array circumferentially offset with respect to the apertures in an adjacent array.

5. The apparatus of claim 4 wherein said means for impacting said reintroduced heavier density components comprises a plurality of radially extending vanes of different lengths.

6. The apparatus of claim 4 including a plurality of accelerating vanes of substantially equal lengths extending to a periphery of an accelerating zone.

7. The apparatus of claim 6 wherein said vanes of substantially equal length include apertures formed therein along the length of said vanes.

8. The apparatus of claim 7 wherein said apertures are offset with respect to the apertures in adjacent vanes.

* * * * *